A. CLARK.
Hay and Manure Fork.
No. 7,134.  Patented Mar. 5, 1850.
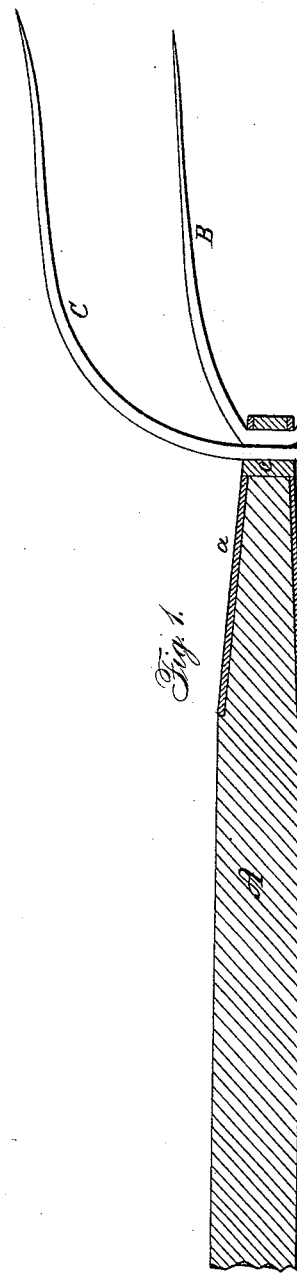
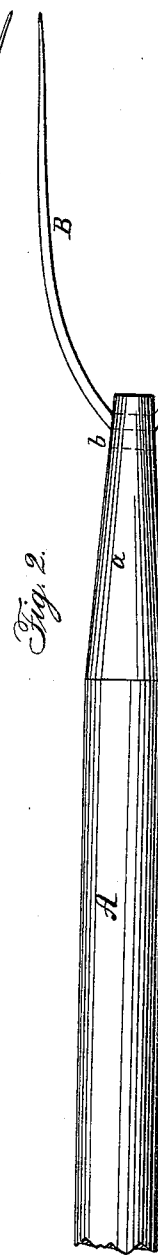

UNITED STATES PATENT OFFICE.

ALINZOR CLARK, OF SOUTHFIELD, NEW YORK.

FASTENING FOR HAY AND MANURE FORKS.

Specification forming part of Letters Patent No. 7,134, dated March 5, 1850.

*To all whom it may concern:*

Be it known that I, ALINZOR CLARK, of Southfield, in the county of Richmond and State of New York, have invented a new and useful improvement in the mode of forming and securing the tines or prongs of hay and manure forks to their handles, which is described as follows, reference being had to the annexed drawings of the same, making part of this specification.

Figure 1 is a section of a manure-fork with the tines or prongs secured after the improved mode. Fig. 2 is a top view of a hay-fork with the prongs or tines secured in a similar manner. Fig. 3 is a side view of the end of the handle of the same to which the tines or prongs are attached.

Similar letters in the figures refer to corresponding parts.

The nature of this invention and improvement consists in forming a mortise or slot in the metallic ferrule inserted on the end of the handle of the hay-fork and in the handle itself, and bending steel bars to the usual form of the tines or prongs of hay and manure forks and inserting them through said mortise or slot, so that they will assume a position in relation to the handle similar to the tines or prongs of the ordinary implements, and securing them in said mortise or slot by a key driven into the same.

To enable others skilled in the art to make and use my invention, I will proceed to describe its construction and advantages.

A is the handle, made of a similar form to those in use, and having a ferrule or ring, *a*, inserted over one end, in which is formed a mortise or slot, extending entirely through the same and through the handle.

B are the tines or prongs of the hay-fork, composed of a single steel bar, gradually tapering from its center to its extremities, and bent at its center to the form of the ordinary tines or prongs of the ordinary hay-fork, and inserted through the mortise or slot in the ferrule and handle so as to bring its center within the same, where it is secured by means of a metallic key or pin, *b*, driven into said mortise between the end of the same and the bar forming the tines or prongs. C is another steel bar, similar to the last mentioned, except that it is of greater length, bent between its extremities to resemble the outer tines or prongs of the ordinary manure-fork, and inserted through the mortise or slot in the metallic ferrule and handle (in case it is desired to convert the hay-fork into a manure-fork) back of the first-mentioned bar, B, and secured in the same by a key or pin, *c*, smaller than the one above mentioned, driven in back of the same.

From a perusal of the foregoing and reference to the drawings it will be observed that by forming the tines or prongs B of the hay-fork from one piece of steel and securing the same by the key or pin *b* in the manner before stated they can be held with great firmness, and in case of breakage near their extremities, which frequently happens, they can be easily replaced with new bars, and that by the addition of the additional prongs or tines C, secured by a smaller key or pin, *c*, the hay-fork can at pleasure be converted into a manure-fork, thus making one handle answer the purpose of the two implements.

What I claim as my invention, and desire to secure by Letters Patent, is—

Forming the tines or prongs B of the hay-fork and the additional tines or prongs, C, which convert the same into a manure-fork, out of single bars of steel bent to the desired form, and securing the same to the handle A by inserting them through the slot or mortise in the same and driving keys or pins *b c* behind the same, substantially as herein set forth.

ALINZOR CLARK.

Witnesses:
S. H. WALES,
O. D. MUNN.